Figure 1:
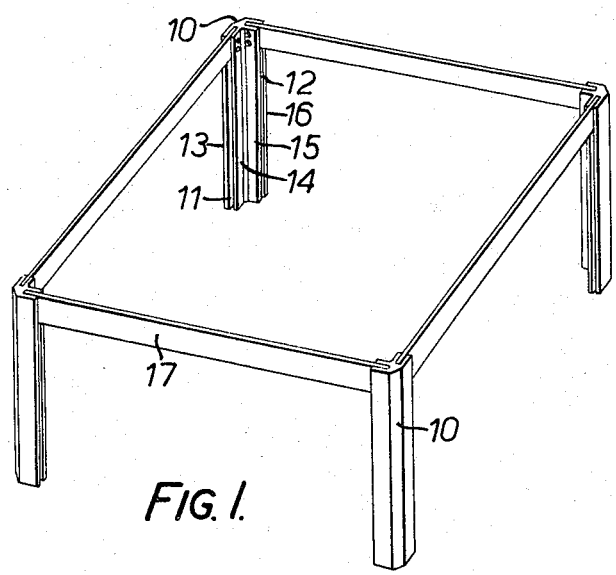

United States Patent [19]
Richards

[11] 3,885,765
[45] May 27, 1975

[54] FURNITURE FRAMES

[76] Inventor: Adrian John Richards, 835 Fulham Rd.-S.W.6, London, England

[22] Filed: Apr. 17, 1973

[21] Appl. No.: 351,892

[52] U.S. Cl. .............. 248/188.1; 211/182; 403/362
[51] Int. Cl. ............................................. F16b 5/00
[58] Field of Search ......... 248/188.1, 165; 211/182, 211/177; 403/362, 382, 403; 108/156

[56] References Cited
UNITED STATES PATENTS

| | | | |
|---|---|---|---|
| 1,191,313 | 7/1916 | Johnston | 403/367 UX |
| 2,691,538 | 10/1954 | Clausen | 403/362 X |
| 3,237,779 | 3/1966 | Eger | 211/177 |
| 3,342,457 | 9/1967 | Bobroinski | 403/205 X |
| 3,612,585 | 10/1971 | Mayr | 211/177 X |

FOREIGN PATENTS OR APPLICATIONS

| | | | |
|---|---|---|---|
| 1,206,128 | 12/1965 | Germany | 248/188.1 |

Primary Examiner—J. Franklin Foss
Attorney, Agent, or Firm—Blum, Moscovitz, Friedman & Kaplan

[57] ABSTRACT

The invention provides a construction of furniture frame, for example for a table or room-divider, in which leg sections of extruded material have longitudinal grooves to which are attached rail members by means of clamping screws the heads of which are concealed on the inside of the frame.

3 Claims, 6 Drawing Figures

FURNITURE FRAMES

This invention relates to furniture frames and the like, for example table frames, shop fittings or display stands, and provides a construction which presents a high quality appearance at low cost and has considerable versatility.

According to the invention a furniture frame, especially a frame for a table, comprises a number of legs of extruded material each having two or more longitudinal parallel-sided grooves into which plain rectangular ends of rails may be inserted to join adjacent legs, the ends of the rails being secured in the grooves by clamping screws which force a side surface of a rail into frictional contact with a side of said groove.

Preferably the grooves are formed between pairs of flanges and two such grooves may be provided at right angles on each leg so as to be joined by rails to make a rectangular frame, but more than two grooves may be provided and other relative angles may be used.

In one form of the invention the clamping screws are threaded in the rails and draw the rails into frictional engagement with a rearward surface of the groove in a corresponding leg. In this form the correct relationship of the rails and legs (usually a right angle) is secured by accurately positioning a pair of threaded holes in the rails and a pair of plain holes in the leg.

The accurate positioning of the holes referred to above is not easy to achieve except with mass-production machinery and in another form of the invention the relationship of the rails and legs is obtained by other means. In this form of the invention the relationship is determined by the engagement of the end surface of a rail with the bottom of the groove in the leg.

For this purpose the end of the rail is provided with a transverse groove across its width and the leg has a pair of suitably placed threaded holes in each of which is located a set screw having a tapered end. This tapered end is arranged to engage one side of the transverse groove in the rail so as to force the rail endwise into engagement with the groove bottom in the leg as well as forcing the rail into engagement with the opposite side of the leg groove.

The parts of each groove that are not occupied by the ends of the rails may be filled with for example an extruded plastic filler strip which is a close fit in the groove.

Figure 2:
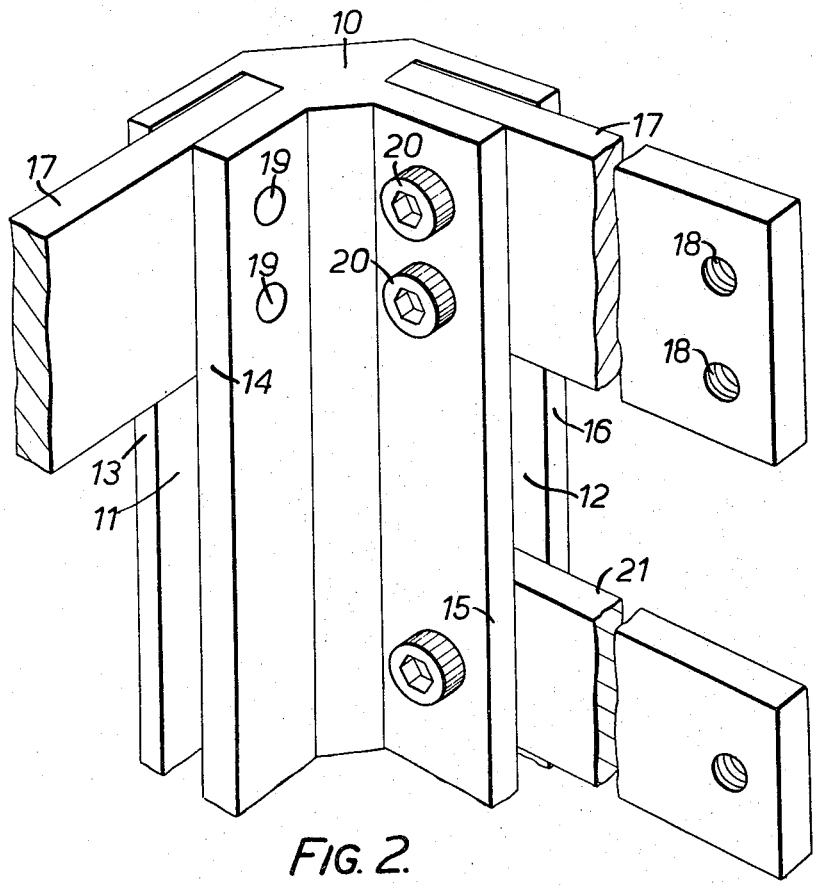
Figure 3:
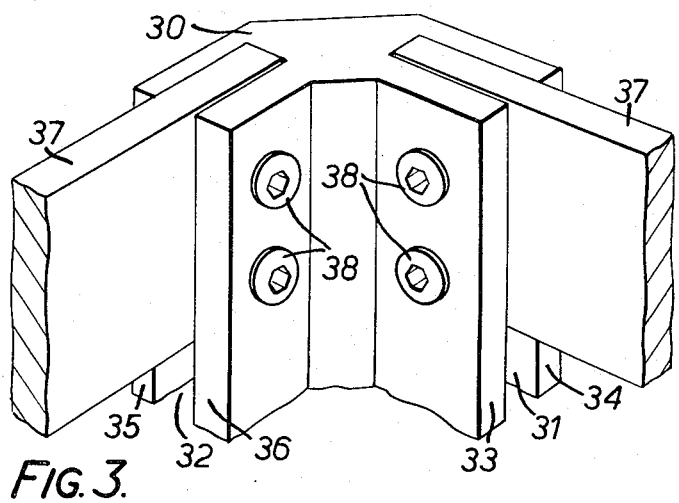
Figure 4:
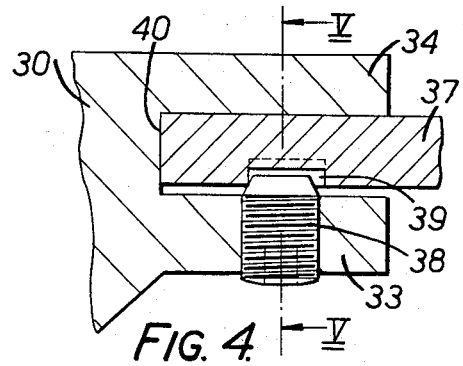
Figure 5:
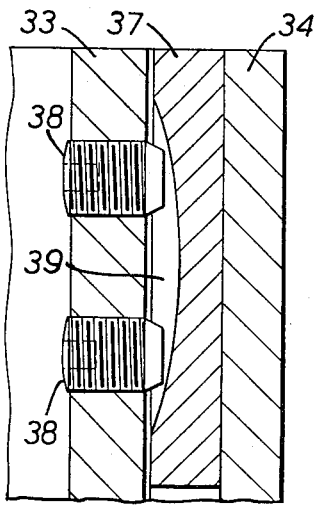
Figure 6:
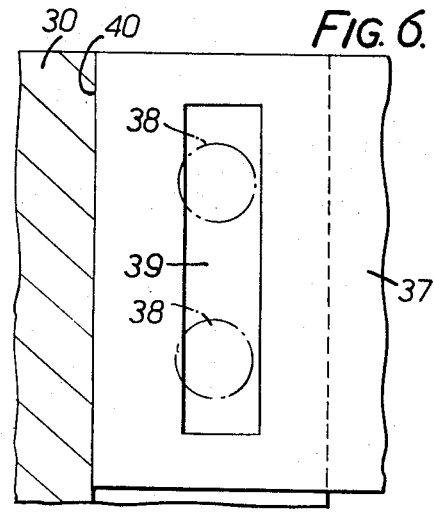

A typical example of a frame according to the invention is illustrated, as an example, in the accompanying drawings in which FIG. 1 is a perspective view of a typical frame FIG. 2 is a perspective detail view of part of the frame of FIG. 1, FIG. 3 is a perspective view similar to FIG. 2 but employing a different method of clamping and FIGS. 4, 5 and 6 are third angle projection showing in detail one of the rail fastenings of FIG. 3, FIG. 5 being a section on the line V—V of FIG. 4.

Referring first to FIGS. 1 and 2 of the drawing a frame for a so-called coffee table consists of four legs 10 of extruded aluminium alloy, the section of the extrusion being shown in more detail in FIG. 2. As will be seen each of the legs 10 is provided with longitudinal grooves 11 and 12 each groove being formed between parallel ribs 13 and 14 and 15 and 16. Adjacent legs of the set of four are joined by rails 17. These rails are plain rectangular section bars, which may be extrusions, and the ends of these bars are inserted into the appropriate slots of the legs 10, at or near the upper ends thereof. The ends of the bars 17 are provided with a pair of tapped holes 18 as shown in FIG. 2 and corresponding holes 19 are drilled in the rib 14 and in the rib 15. Screws 20 are inserted through the holes 19 and screwed into the holes 18 thus drawing the rear face of the corresponding bars 17 tightly against the inside surfaces of the ribs 14 and 15. When completely assembled in this way the structure provides a rectangular frame with four legs. With a rail depth of 1¾ inches this structure provides adequate rigity for a leg length of up to about 18 inches. Where longer legs are used, however, such as for dining tables which usually have a leg length of 30 inches additional stiffness may be introduced by adding a further rail as at 21 in FIG. 2. This further rail need not be of the same depth as the rail 17 and it need be provided with only one screw fastening at each end.

The clamping of the parts of the frame together by means of screws tapped into the rails so as to draw them against the rearwardly located ribs 14, 15 of the legs resulsts in all mechanical forces due to attempted relative displacement of leg and rail being removed from the forwardly located ribs 13, 16. The latter ribs can thus be made relatively slender so as to give a neat and elegant external appearance to the frame.

The form of the invention shown in FIG. 3 is broadly similar to that shown in FIG. 2 but employs a type of fastening for connecting a rail to a leg which lends itself to simpler jigging arrangements for its production. As before the leg section, in this case indicated by the reference 30, has longitudinal grooves 31, 32, each groove being formed between parallel ribs 33, 34, and 35, 36, Rails 37 form the joining pieces to make up a frame employing a number of legs in the general manner indicated with reference to FIG. 1. The ends of the rails 37 are clamped in the appropriate grooves of the legs 30 by set screws 38. These force the rails outwards against the outer face of a groove such as is formed by the rib 34. In this case the rib 34 is thickened, compared with the rib 16 of FIG. 2, so as to withstand the thrust applied when the set screws 38 are tightened.

The method of construction and clamping is shown in more detail in FIGS. 4, 5, and 6.

In these figures a leg 30 is shown sectioned at one of the clamping screws 38. These screws 38 which are threaded in the rib 33, are provided with tapered ends and the rail 37 has a transverse groove 39 cut so that its edge nearest the base 40 of the groove 31 is engaged by the leading part of the taper end of the screw 38 as it is driven home. This causes the rail 37 to be both clamped against the inside face of the rib 34 and against the base 40 of the groove 31.

The groove 39 is intended to be mutilated by the screws 38 as they are driven home, and it may be a wide groove as shown or it may be narrower than the diameter of the screws 38 as long as its edge nearest the base 40 is in the correct position relative to the taper of the screws 38. In either case the groove 39 is conveniently produced by a cutting-off saw of the kind that has a circular blade that is moveable towards the work by swinging about a fixed journal. By setting the rail end (which may have been cut off by the same saw) against a fixed stop the blade of the saw can be caused to define very accurately the edge of the groove 39 and at the same time the movement of the saw towards the work may be arrested by a stop set so that the groove 39 does not break into the upper and lower surfaces of the rail 37 but stops short of them as shown in FIGS. 5 and 6. In this way, as will be seen from FIG. 3 the end of this groove is not visible in the finished product.

Having set the edges of the groove 39 with great accuracy in this way somewhat greater latitude may then be accepted for the holes in which the screws 38 are threaded since the taper of the screws will engage the appropriate edge of the groove 39 over a range of positions of the screw holes. Very accurate work may thus be produced with relatively simple and inexpensive machinery. Moreover, the machining time is kept to a very low level.

As will be seen the construction results in a metal furniture frame which is relatively inexpensive since the constituent parts consist of simple shapes which can therefore be polished easily and cheaply before being assembled, whereas with conventional constructions that are welded together polishing can only take place after assembly and is thus difficult and expensive as is the subsequent plating.

The material of which the leg portions of the present invention are made can be any material that can be extruded such as aluminium or one of its alloys. This can be given a high polish which can be protected in use for reasonably long periods by a wax coating. Alternatively, the metal may be anodized or even plated. The external appearance is of course largely a matter of fashion, which at the present time is in favour of highly polished metal, but it is possible that at some future date a commercially successful frame could be produced from leg sections extruded from synthetic thermoplastic materials such as nylon.

What I claim is:

1. A rectangular furniture frame comprising four leg members each of which consists of an extruded profile bar with a pair of continuous longitudinal grooves substantially at right angles to each other and symmetrically arranged about a centre line through the cross-section of said bar at 45° to each of said grooves, said bar being bevelled externally across said centre line, and four rail members each consisting of a substantially flat plane bar the ends of which are located in the grooves of adjacent leg members and clamped therein, by screws inserted from the inside of the leg members, so as to lie with its top surface flush with the top surface of the corresponding leg members.

2. A furniture frame comprising a number of legs of extruded material each having two or more continuous uninterrupted longitudinal grooves, a like number of rails having ends that fit into said grooves, each said end having a machined end surface for mating with the base of a groove to determine the angular relationship between the rail and the leg, and clamping screws acting directly between the rail and the leg for simultaneously forcing the end of the rail against said base and forcing a side surface of the rail into frictional contact with a side of the groove, wherein said clamping screws comprise at each rail end at least one taper ended screw threaded in a hole in one of the ribs forming the groove of the leg, co-operating with a transverse recess in the end of the rail, one edge of which recess nearest said machined end surface is located so as to be engaged by the leading portion of the taper of the corresponding screw, so as upon tightening to force said rail lengthwise with its machined end surface against the base of the groove as well as causing said frictional contact.

3. A furniture frame according to claim 2, wherein said recess does not extend through to the edge surfaces of said rail.

* * * * *